United States Patent
Ahn et al.

(10) Patent No.: US 9,868,830 B2
(45) Date of Patent: Jan. 16, 2018

(54) METHOD OF PREPARING THE VINYL CHLORIDE BASED NANOCOMPOSITE

(71) Applicant: LG CHEM, LTD., Seoul (KR)

(72) Inventors: Seong Yong Ahn, Daejeon (KR); Byung Kook Ahn, Daejeon (KR); Soo Hwan Hwang, Daejeon (KR); Kyung Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/494,203

(22) Filed: Apr. 21, 2017

(65) Prior Publication Data

US 2017/0218140 A1  Aug. 3, 2017

Related U.S. Application Data

(62) Division of application No. 14/436,720, filed as application No. PCT/KR2014/008615 on Sep. 16, 2014, now Pat. No. 9,714,312.

(30) Foreign Application Priority Data

Sep. 17, 2013 (KR) .................. 10-2013-0111875
Sep. 5, 2014 (KR) .................. 10-2014-0118563

(51) Int. Cl.
*C08L 27/06* (2006.01)
*C08L 35/00* (2006.01)
(Continued)

(52) U.S. Cl.
CPC ............. *C08J 5/005* (2013.01); *C08J 3/05* (2013.01); *C08J 2331/02* (2013.01);
(Continued)

(58) Field of Classification Search
None
See application file for complete search history.

(56) References Cited

U.S. PATENT DOCUMENTS

| 4,360,651 A | 11/1982 | Dinbergs | C08F 2/30 521/56 |
| 2007/0100044 A1* | 5/2007 | Jeon | B82Y 30/00 524/284 |
| 2008/0153966 A1 | 6/2008 | Feinberg | C08L 27/06 524/436 |

FOREIGN PATENT DOCUMENTS

| CN | 1871289 A | 11/2006 |
| JP | 06-184217 A | 7/1994 |
(Continued)

OTHER PUBLICATIONS

Fengge Gao "Advances in Polymer Nanocomposites: Types and Applications," Woodhead Publishing, Cambridge, 2012 (Chapter 8).
Data Sheet of Disperbyk® 102 from BYK.

*Primary Examiner* — Vu A Nguyen
(74) *Attorney, Agent, or Firm* — Dentons US LLP

(57) ABSTRACT

Disclosed are a vinyl chloride based nanocomposite composition and a method of preparing the vinyl chloride based nanocomposite. According to the present invention, a method of preparing a straight vinyl chloride based nanocomposite having a nanomaterial uniformly dispersed therein, by using the vinyl chloride based nanocomposite composition when a vinyl chloride monomer is suspension polymerized in the presence of a protective colloidal agent and a polymerization initiator after preparing a water dispersion suspension using the vinyl chloride based nanocomposite composition based on a hydrophilic composition is provided.

6 Claims, 4 Drawing Sheets

(51) Int. Cl.
*C08J 5/00* (2006.01)
*C08J 3/05* (2006.01)
(52) U.S. Cl.
CPC ........ *C08J 2401/28* (2013.01); *C08J 2427/06* (2013.01); *C08J 2429/04* (2013.01)

(56) References Cited

FOREIGN PATENT DOCUMENTS

| KR | 89-003575 A | 9/1989 |
| KR | 10-2005-0046827 A | 5/2005 |
| KR | 10-2008-0001113 A | 1/2008 |
| KR | 10-2012-0007227 A | 1/2012 |

* cited by examiner

METHOD OF PREPARING THE VINYL CHLORIDE BASED NANOCOMPOSITE

CROSS REFERENCE TO RELATED APPLICATION(S)

This application is a Divisional application of U.S. patent application Ser. No. 14/436,720, filed on Apr. 17, 2015, now allowed, which is a National Stage Entry of International Application No. PCT/KR2014/008615, filed on Sep. 16, 2014, which claims priority to and the benefit of Korean Patent Application No. 10-2013-0111875, filed on Sep. 17, 2013 and Korean Patent Application No. 10-2014-0118563, filed on Sep. 5, 2014, all of which are hereby incorporated herein by reference in their entirety.

TECHNICAL FIELD

The present invention relates to a method of preparing the vinyl chloride based nanocomposite. More particularly, the present invention relates a method of preparing a straight vinyl chloride based nanocomposite having a nanomaterial uniformly dispersed therein, by including the vinyl chloride based nanocomposite composition when a vinyl chloride monomer is suspension polymerized in the presence of a protective colloidal agent and a polymerization initiator after preparing a water dispersion suspension using the vinyl chloride based nanocomposite composition based on a hydrophilic composition is provided.

BACKGROUND ART

Vinyl chloride based polymers are used in a variety of fields since they are cheap and have excellent quality balance.

Vinyl chloride based polymers are largely classified into paste resins and straight resins.

Paste resins are prepared through emulsion polymerization. In particular, monomers, water, a surfactant, and the like are homogenized using a homogenization device, and then moved to a polymerization device for polymerization. The polymerized paste resins are used in wallpaper, linoleum, and the like.

Straight resins are prepared through suspension polymerization. The straight resins are classified into soft and hard products according to use thereof. General soft products are used in wire clothing, wrap films, sheets, and the like using large amounts of plasticizer. The hard products are used in a variety of fields such as pipes, films, window frames, and the like by adding a variety of additives such as impact modifiers, thermal stabilizers, processing aids, pigments, inorganic filler, and the like.

Vinyl chloride based polymers exhibit weak thermal resistance, impact resistance, and mechanical strength. To supplement the problems, thermal stabilizers, impact modifiers, and inorganic materials are added thereto. As the inorganic materials, a variety of materials such as calcium carbonate, silica, titanium oxide, clay, carbon black, zinc oxide, and the like are used depending on required properties. Recently, technology to prepare and use nanoscale composites is being developed.

The nanoscale composites (hereinafter, nanocomposites) are composed of two or more structure or material types, and mean materials having nanoscale phase sizes ($10^{-9}$ m). In particular, a polymer nanocomposite has mechanical strength such as thermal resistance, impact resistance, and the like dramatically improved by exfoliating and dispersing inorganic nanomaterials of 1 nm to 500 nm over a polymer material. In addition, the polymer nanocomposite may have flexibility and machinability, which are properties of the polymer, and mechanical strength, thermal resistance, and the like, which are properties of inorganic nanomaterials, at the same time, and as such, receives great attention.

The nanocomposites may satisfy required properties when inorganic nanomaterials are uniformly dispersed in polymer materials. However, in the case of the vinyl chloride based polymers, it is extremely difficult to prepare nanocomposites by uniformly dispersing inorganic nanomaterials. Accordingly, in most cases, a method of preparing the vinyl chloride based inorganic composites is limited to a method of mechanically mixing general inorganic materials.

DISCLOSURE

Technical Problem

Therefore, the present invention has been made in view of the above problems, and it is one object of the present invention to provide a straight vinyl chloride based nanocomposite so as to improve water dispersion effects of inorganic nanomaterial by using a vinyl chloride based nanocomposite composition composed of hydrophilic ingredients, as a basis, and uniformly disperse a hydrophilic inorganic nanomaterial using the inorganic nanomaterial in vinyl chloride based suspension polymerization.

It is another object of the present invention to provide a vinyl chloride based nanocomposite composition including a hydrophilic inorganic nanomaterial; and at least one hydrophilic polymer selected from the group consisting of an unsaturated organic acid based polymer and a polycarboxylic acid based (co)polymer.

It is yet another object of the present invention to provide a method of preparing the vinyl chloride based nanocomposite by suspension polymerizing the vinyl chloride based nanocomposite composition.

Technical Solution

In accordance with one aspect of the present invention, provided is a vinyl chloride based nanocomposite composition including a hydrophilic inorganic nanomaterial; and at least one hydrophilic polymer selected from the group consisting of an unsaturated organic acid based polymer and polycarboxylic acid based (co)polymer.

In accordance with another aspect of the present invention, provided is a method of preparing the vinyl chloride based nanocomposite, the method including mixing a hydrophilic inorganic nanomaterial; at least one hydrophilic polymer selected from the group consisting of an unsaturated organic acid based polymer and a polycarboxylic acid based (co)polymer; and water, to prepare a water dispersion suspension; adding a protective colloidal agent and a vinyl chloride based monomer to the water dispersion suspension and mixing to prepare a solution; and adding an initiator to the solution and performing suspension polymerization.

In accordance with yet another aspect of the present invention, provided is a straight vinyl chloride based nanocomposite prepared according to the preparation method.

Advantageous Effects

As apparent from the fore-going, the present invention advantageously provides a method of preparing a straight vinyl chloride based nanocomposite having a nanomaterial uniformly dispersed therein, by including the vinyl chloride based nanocomposite composition when a vinyl chloride monomer is suspension polymerized under a protective colloidal agent and a polymerization initiator after preparing a water dispersion suspension using the vinyl chloride based nanocomposite composition based on a hydrophilic composition is provided.

BEST MODE

Figure 1:
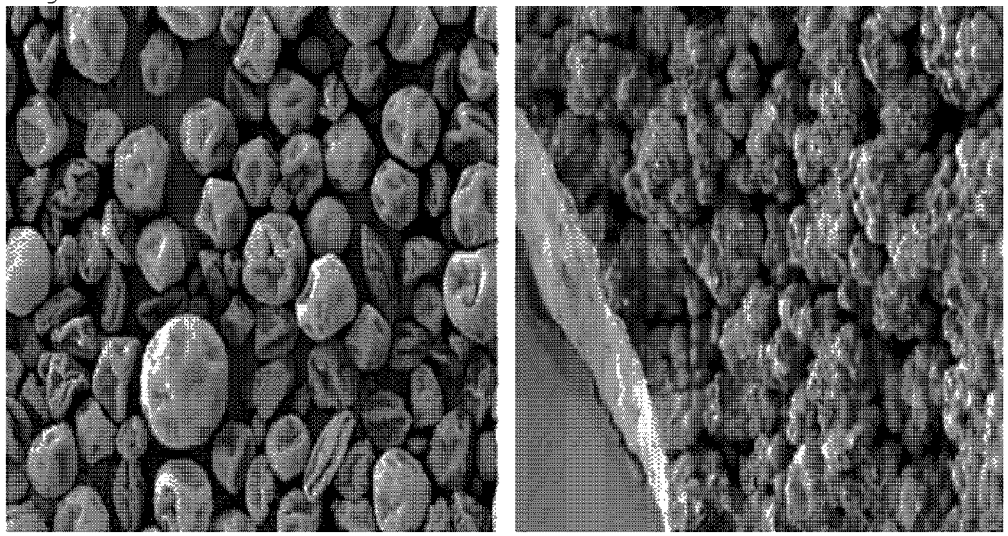
FIG. 1 illustrates surface (×100) and sectional (×3000) scanning electron microscope (SEM) images of vinyl chloride based organic/inorganic nanocomposite particles including nano-silica.
Figure 2:
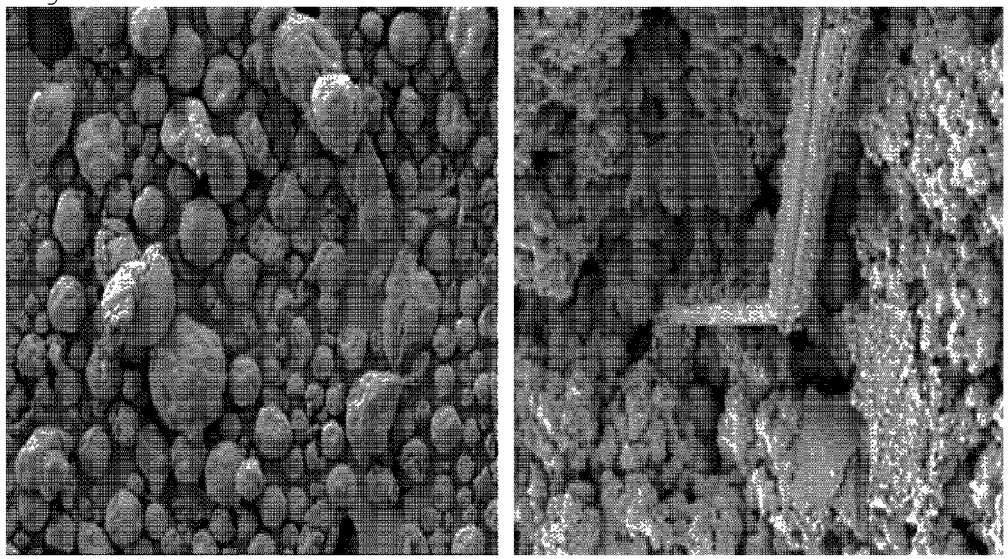
FIG. 2 illustrates surface (×100) and sectional (×3000) scanning electron microscope (SEM) images of vinyl chloride based organic/inorganic nanocomposite particles including nano-clay.
Figure 3:
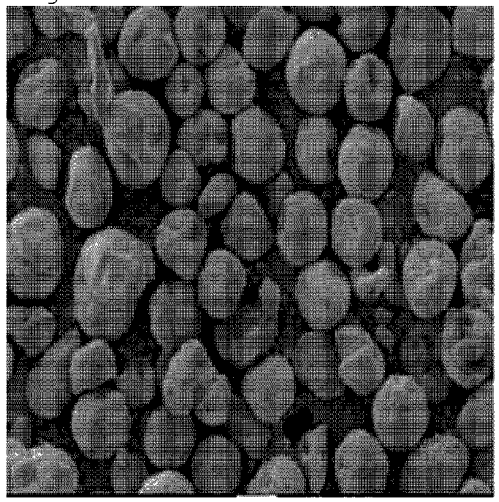
FIG. 3 illustrates surface (×100) and sectional (×3000) scanning electron microscope (SEM) images of vinyl chloride based organic/inorganic nanocomposite particles including nano-calcium carbonate.
Figure 3:
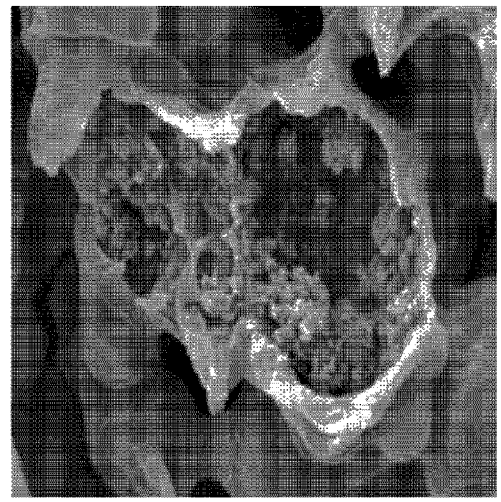
Figure 4:
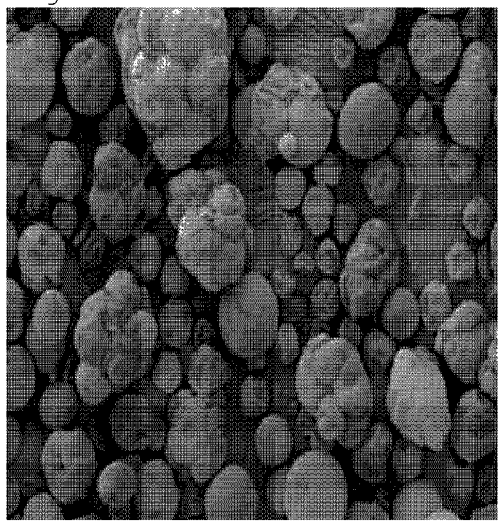
FIG. 4 illustrates surface (×100) and sectional (×3000) scanning electron microscope (SEM) images of vinyl chloride based organic/inorganic nanocomposite particles including nano-titanium oxide.
Figure 4:
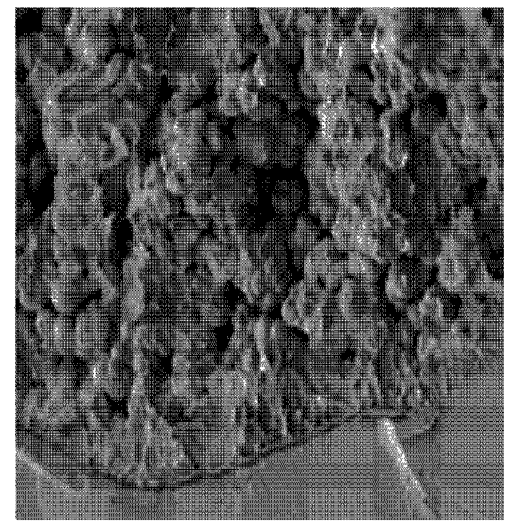
Figure 5:
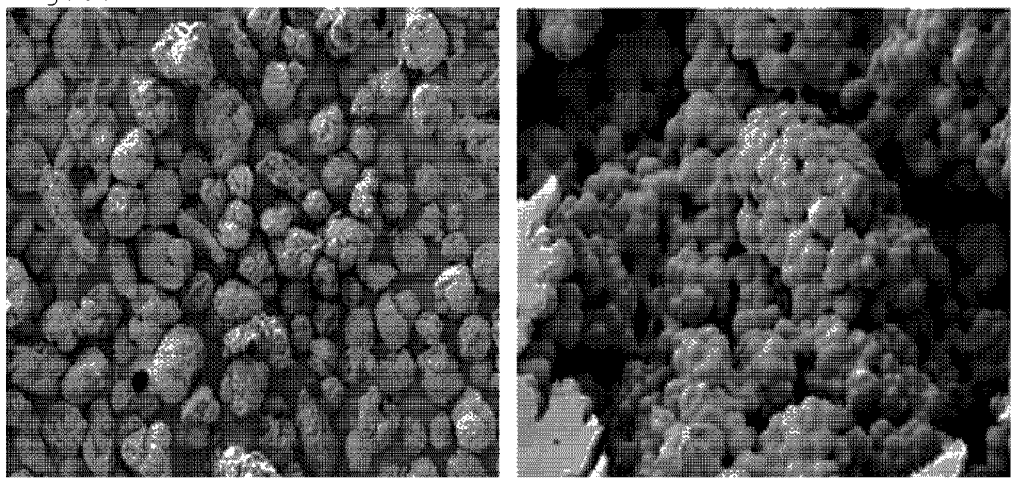
FIG. 5 illustrates surface (×100) and sectional (×3000) scanning electron microscope (SEM) images of vinyl chloride based organic/inorganic nanocomposite particles including nano-carbon black.

Hereinafter, the present invention will be described in detail.

A vinyl chloride based nanocomposite composition according to the present invention includes a hydrophilic inorganic nanomaterial and at least one hydrophilic polymer selected from the group consisting of an unsaturated organic acid based polymer and a polycarboxylic acid based (co) polymer. The vinyl chloride based nanocomposite composition has improved hydrophilic inorganic nanomaterial water dispersion effects and, as such, exhibits excellent impact strength, machinability, and thermal resistance.

In the present invention, the expression "hydrophilic inorganic nanomaterial" means a hydrophilic inorganic nanomaterial used without additional treatment and an inorganic nanomaterial which is lipophilically treated. In one embodiment, the hydrophilic inorganic nanomaterial may be at least one selected from the group consisting of calcium carbonate, silica, titanium oxide, clay, and carbon black and an average diameter thereof may be 1 to 300 nm, 10 to 200 nm, or 20 to 120 nm. Within this range, the hydrophilic inorganic nanomaterial may exhibit excellent impact strength, machinability, and thermal resistance.

In the present invention, the expression "hydrophilic polymer" means at least one selected from the group consisting of unsaturated organic acid based polymers and polycarboxylic acid based (co)polymers which are used without additional treatment, so long as not differently specified.

In one embodiment, the unsaturated organic acid based polymer and at least one selected from the group consisting of polycarboxylic acid based (co)polymers are included in an amount of 0.1 to 15 parts by weight, 1 to 10 parts by weight, 3 to 10 parts by weight, or 3.3 to 10 parts by weight, based on 100 parts by weight of the hydrophilic inorganic nanomaterial. Within this range, the amount of the unsaturated organic acid polymer or polycarboxylic acid based (co)polymer remaining in the vinyl chloride based nanocomposite is reduced and dispersion effects of the hydrophilic inorganic nanomaterial are improved. As a result, the hydrophilic inorganic nanomaterial exhibits improved whiteness or transparency.

The unsaturated organic acid polymer, for example, may be at least one selected from the group consisting of acrylic acid polymers, methacrylic acid polymers, itaconic acid polymers, fumaric acid polymers, maleic acid polymers, succinic acid polymers, oleic acid polymers, and gelatin.

The polycarboxylic acid based (co)polymer may be a homopolymer or a copolymer including Formula 1 below as a backbone:

[Formula 1]

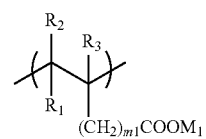

wherein each of $R_1$, $R_2$, and $R_3$ is hydrogen or a C1 to C5 alkyl group, $M_1$ is hydrogen, alkali metal, alkali earth metal, a C1 to C10 alkylammonium group, or a C1 to C10 alkyl alcohol ammonium group, and $_{m1}$ is an integer of 0 to 2.

In addition, in $M_1$, the alkali metal, for example, is sodium or potassium, the alkali earth metal, for example, is magnesium or calcium, and the C1 to C10 alkylammonium group is, for example, dimethylammonium, methyl ethyl ammonium, diethylammonium, trimethylammonium, trimethylammonium, or tetramethylammonium. In this case, water dispersion effects are improved and superior property balance is exhibited.

The C1 to C10 alkyl alcohol ammonium group, for example, may be triethanolammonium or diisopropylammonium. In this case, water dispersion effects are improved and superior property balance is exhibited.

The polycarboxylic acid based (co)polymer may, for example, be a polymer, which is not identical to the unsaturated organic acid polymer, including at least one selected from the group consisting of carboxylic acid, acrylic acid, methacrylic acid, methyl(meth)acrylic acid, ethyl(meth) acrylic acid, trimethylacrylic acid, maleic acid, fumaric acid, itaconic acid, crotonic acid, citraconic acid, vinyl acetate, 4-pentanoic acid, and salts thereof for polymerization.

In addition, a weight average molecular weight of the polycarboxylic acid based resin may, for example, be 10,000 to 100,000 g/mol, or 30,000 to 70,000 g/mol. Within this range, dispersion effects of the hydrophilic inorganic nanomaterial and compatibility with a vinyl chloride based monomer are excellent.

In addition, the method of preparing the vinyl chloride based nanocomposite using the vinyl chloride based nanocomposite composition, for example, includes mixing the hydrophilic inorganic nanomaterial, at least one hydrophilic polymer selected from an unsaturated organic acid based polymer and a polycarboxylic acid based (co)polymer, and water to prepare a water dispersion suspension; adding a protection colloidal agent and a vinyl chloride based monomer to the water dispersion suspension and mixing to prepare a solution; and adding an initiator to the solution and suspension polymerizing.

The water dispersion suspension, for example, may include 1 to 20 parts by weight or 4 to 12 parts by weight of the hydrophilic inorganic nanomaterial, based on 100 parts by weight of water. Within this range, property balance is excellent and water dispersion effects of the hydrophilic inorganic nanomaterial are improved during suspension polymerization. As a result, properties of the vinyl chloride based nanocomposite are improved.

The water dispersion suspension, for example, may include at least one hydrophilic polymer selected from an unsaturated organic acid based polymer and a polycarboxylic acid based (co)polymer in an amount of 0.01 to 1.5 parts by weight or 0.1 to 0.5 parts by weight, based on 100 parts by weight of water. Within this range, property balance is excellent and superior water dispersion effects of the hydrophilic inorganic nanomaterial are exhibited.

The water dispersion suspension is used in suspension polymerization of the vinyl chloride based monomer and, as such, the straight vinyl chloride based nanocomposite may be prepared.

The stirring in steps to prepare the water dispersion suspension, for example, may be carried out for 0.1 to 3 hours or 0.5 to 1.5 hours.

The solution, for example, includes a water dispersion suspension 100 to 200 parts by weight and protective colloidal agent 0.001 to 5 parts by weight based on 100 parts by weight of the vinyl chloride based monomer.

The protective colloidal agent, for example, is used in an amount of 0.001 to 5 parts by weight or 0.01 to 2 parts by weight. Within this range, protective colloidal properties are satisfactory and formation of microparticles or coarse particles is reduced. As a result, particle formation is stabilized.

The protective colloidal agent, for example, may be at least one selected from the group consisting of a vinyl alcohol based resin, a hydration degree of which is 70 to 98% and viscosity of a 4% aqueous solution of which is 5 to 100 cps at room temperature, cellulose, and unsaturated organic acid, the cellulose and unsaturated organic acid including 15 to 40 wt % of a methoxy group and 3 to 20 wt % of a hydroxypropyl group, and 2% aqueous solutions of the cellulose and unsaturated organic acid having viscosity of 10 to 20,000 cps at room temperature. As a specific embodiment, the protective colloidal agent may be a vinyl alcohol based resin having a hydration degree of 70 to 98%, a vinyl alcohol based resin having a hydration degree of 35 to 60%, or a mixture thereof. As another embodiment, the protective colloidal agent may be a vinyl alcohol based resin having a hydration degree of 85 to 98%, a vinyl alcohol based resin having a hydration degree of 50 to 60%, or a mixture thereof.

In one embodiment, the initiator may be included in an amount of 0.0001 to 0.5 parts by weight, or 0.001 to 0.1 parts by weight, based on 100 parts by weight of the vinyl chloride based monomer.

The initiator, for example, may be at least one selected from the group consisting of diacyl peroxides, peroxydicarbonates, peroxyesters, azo compounds, and sulfates.

The vinyl chloride based monomer may be a vinyl chloride based monomer or a mixture, which includes the vinyl chloride based monomer, polymerizable with the vinyl chloride based monomer. In the case of the mixture, the amount of the vinyl chloride based monomer is preferably 50 wt % or more.

The vinyl based monomer copolymerizable with the vinyl chloride based monomer may, for example, be an olefin compound such as ethylene, propylene, or the like; a vinyl ester such as vinyl acetate, propionic acid vinyl, or the like; a unsaturated nitrile such as acrylonitrile or the like; or a vinyl alkyl ether such as vinyl methyl ether, vinyl ethyl ether, or the like. At least one selected from the compounds may be used as a mix with the vinyl chloride based monomer.

The suspension polymerization, for example, may be terminated by adding a reaction terminator. A resultant slurry may be dried through a general drying method. Reaction termination may be carried out when pressure of a reactor is 6.0 to 8.0 kg/cm$^2$, namely, when a polymerization transition rate is 80 to 90% or 83 to 88%.

The reaction terminator may be any one generally used in preparation of the vinyl chloride based resin. For example, the reaction terminator may be a phenolic compound, amine compound, nitrile compound, or sulfur compound.

The phenolic compound, for example, may be triethyleneglycol-bis-3-(3-t-butyl-4-hydroxy-5-methylphenyl)propionate, hydroquinone, p-methoxy phenol, t-butylhydroxyanisole, n-octadecyl-3-(4-hydroxy-3,5-di-t-butylphenyl) propionate, 2,5-di-t-butylhydroquinone, 4,4-butylidenebis (3-methyl-6-t-butyl phenol), t-butyl catechol, 4,4-thiobis(6-t-butyl-m-cresol), or tocopherol. The amine compound may, for example, be N,N-diphenyl-p-phenylenediamine or 4,4-bis(dimethylbenzyl)diphenylamine. The nitrile compound, for example, may be 2-phenyl nitronyl nitroxide, 3-imidazolinenitroxide, or 4-hydroxy-2,2,6,6-tetramethyl-piperidine-1-oxyl. The sulfur compound, for example, may be dodecyl mercaptan or 1,2-diphenyl-2-thiol. At least one selected from the compounds may be used.

Additionally, a polymerization regulator, a chain-transfer agent, a pH adjuster, an antioxidant, a cross-linking agent, an antistatic agent, a scale inhibitor, a surfactant, or the like may be partitionally or continuously added before polymerization initiation, after polymerization, or during polymerization.

The method of preparing the vinyl chloride based nanocomposite through suspension polymerization of the present invention, for example, may be a method of preparing the vinyl chloride based nanocomposite by preparing a hydrophilic inorganic nanomaterial water dispersion suspension including an unsaturated organic acid or a polycarboxylic acid based polymer and by suspension polymerizing the vinyl chloride based monomer while maintaining polymerization base temperature according to a target average polymerization temperature during an overall reaction process in the presence of a protective colloidal agent and a polymerization initiator.

The polymerization base temperature is determined according to a target average polymerization degree and a range of the polymerization base temperature is 30 to 80° C.

Since the polymerization base temperature depends on characteristics of facility or manufactures, it is difficult to individually select conditions in all cases for a target average polymerization degree. For example, the polymerization base temperature is 63 to 65° C. when the target average polymerization degree is 800, polymerization base temperature is 60 to 62° C. when the target average polymerization degree is 900, polymerization base temperature is 56 to 58° C. when the target average polymerization degree is 1000, polymerization base temperature is 52 to 54° C. when the target average polymerization degree is 1300, and polymerization base temperature is 47 to 49° C. when the target average polymerization degree is 1700. In addition, when polymerization base temperature is less than 30° C. or greater than 80° C., a target average polymerization degree may be less than 700 or greater than 1700.

In addition, a polymerization degree of the vinyl chloride based nanocomposite may be varied according to polymerization temperature and, for example, may be 680 to 2500, or 680 to 1100.

The reactor used in the present invention may be a stirring device generally used to suspension polymerize vinyl chloride based resins. For example, as the stirring device, a stirring device, a wing of which is a paddle type, a pitched paddle type, bloomers gin type, a Pfaudler type, a turbine type, a propeller type, or a combination thereof, may be used. As a baffle type, a plate type, a cylindrical type, a D type, a loop type, or a finger type may be used.

Water of a slurry of the vinyl chloride based nanocomposite is removed using a fluidized bed dryer under general reaction conditions, to prepare the vinyl chloride based nanocomposite.

In addition, a vinyl chloride based nanocomposite prepared by the method of preparing the vinyl chloride based nanocomposite is provided. The vinyl chloride based nanocomposite is characterized by uniformly including a hydrophilic inorganic nanomaterial. For example, a content ratio of coarse particles having an average diameter of 100 nm or more to fine particles having an average diameter of 5 nm or less in the hydrophilic inorganic nanomaterial, for example, is within a range of 95:5 to 99:1. Within this range, excellent property balance may be exhibited.

Now, the present invention will be described in more detail with reference to the following examples. These examples are provided only for illustration of the present invention and should not be construed as limiting the scope and spirit of the present invention.

EXAMPLE 1

390 kg of deionized water, 1.5 kg of a poly maleic acid vinyl acetate copolymer as a polycarboxylic acid based (co)polymer, and 30 kg of nano-silica having a size of 80 nm, were added to a reactor having an inner space of 1 m$^3$ and equipped with a reflux condenser, and then stirred for 1 hour, to prepare a water dispersion suspension.

With the resultant water dispersion suspension, polyvinylalcohol having a hydration degree of 87.5% was added in an amount of 150 g and hydroxypropylmethyl cellulose was added in an amount of 150 g to the reactor. Subsequently, 300 kg of a vinyl chloride monomer was added thereto and then stirred for 1 hour, to prepare a solution. Subsequently, 30 g of di-2-ethylhexylperoxydicarbonate and 120 g of t-butylperoxy neodecanoate were added thereto and then suspension polymerization was initiated.

To achieve a target average polymerization degree 1000 during an overall polymerization process, reaction was carried out while maintaining 57° C. In addition, when a polymerization reactor pressure reached 6.0 kg/cm$^2$, 15 g of 4-hydroxy-2,2,6,6-tetramethyl-piperidine-1-oxyl and 60 g of triethyleneglycol-bis-3-(3-t-butyl-4-hydroxy-5-methylphenyl)propionate as reaction terminators were added to the reactor and then unreacted monomers were collected. A resin slurry was collected from the polymerization reactor.

The obtained slurry was dried in a fluidized bed dryer through a general method. As a result, a vinyl chloride based nanocomposite was obtained.

4 parts by weight of a tin based stabilizer, 1 parts by weight of a processing aid (product name: PA-910), 6 parts by weight of an impact modifier (product name: MB872), and 0.5 parts by weight of a lubricant (product name: SL63) were mixed with 100 parts by weight of the vinyl chloride based nanocomposite and kneaded for 3 minutes at 185° C. using a roll, to obtain a sheet. The resultant sheet was cut, laminated, and manufactured into a pressed sheet through press forming. Transparency of the pressed sheet was measured. As a result, the transparency was 78.8.

EXAMPLE 2

Polymerization was carried out under the same conditions as in Example 1, except that 30 kg of nano-clay having a size of 120 nm was used instead of the nano-silica having a size of 80 nm and 1.0 kg of polyfumaric acid was used instead of 1.5 kg of the polycarboxylic acid based (co)polymer as an unsaturated organic acid polymer.

5 parts by weight of a composite stabilizer (product name: WPS-60) including a thermal stabilizer and a lubricant, 1.5 parts by weight of a processing aid (product name: PA-828), and 2 parts by weight of titanium oxide were added to 100 parts by weight of the obtained vinyl chloride based nanocomposite and calendered for 5 minutes at 185° C. using a roll mill. Subsequently, the resultant product was pressed for 2 minutes at 185° C. under a pressure of 10 K/G using a presser, resulting in preparation of a hard sample. Tensile strength of the obtained sample was measured based on ASTM D638.

As a result, tensile strength of the obtained sample was 650 kg/cm$^2$ and transparency thereof, which was measured in the same manner as in Example 1, was 77.2.

EXAMPLE 3

Polymerization was carried out in the same manner as in Example 1, except that 20 kg of nano-calcium carbonate having a size of 40 nm was used instead of nano-silica having a size of 80 nm, the reaction was carried out while maintaining temperature to 65° C. to accomplish an average polymerization degree of 800 instead of a reaction temperature of 57° C. to accomplish an average polymerization degree 1000 during an overall polymerization process, and reaction terminators were added when pressure of the polymerization reactor reached to 8.0 kg/cm$^2$ instead of 6.0 kg/cm$^2$.

To 100 parts by weight of the obtained vinyl chloride based nanocomposite, 5 parts by weight of a composite stabilizer (product name: WPS-60) including a thermal stabilizer and a lubricant, 1.5 parts by weight of a processing aid (product name: PA-828), and 2 parts by weight of titanium oxide were added, resulting in preparation of a mixture. 55 g of the resultant mixture was added at a rate of 40 rpm at 180° C. using a Brabender mixer to measure a fusion time. As a result, the fusion time was 105 seconds.

In addition, 5 parts by weight of a composite stabilizer (product name: WPS-60) including a thermal stabilizer and a lubricant, 1.5 parts by weight of a processing aid (product name: PA-828), and 2 parts by weight of titanium oxide were added to 100 parts by weight of the vinyl chloride based nanocomposite and then calendered for 5 minutes at 185° C. using a roll mill. Subsequently, the resultant product was pressed for 2 minutes at 185° C. under a pressure of 10 K/G using a presser, resulting in preparation of a hard sample. Impact strength of the hard sample was measured according to ASTM D256. As a result, the impact strength of the hard sample was 90 Kgf·cm/cm$^2$.

EXAMPLE 4

Polymerization was carried out in the same manner as in Example 1, except that 15 kg of nano-titanium oxide having a size of 20 nm was used instead of nano-silica having a size of 80 nm, the reaction was carried out while maintaining 65° C. to accomplish an average polymerization degree of 800 instead of 57° C. to accomplish an average polymerization degree of 1000 during an overall polymerization process, and reaction terminators were added when pressure of a polymerization reactor reached 8.0 kg/cm$^2$ instead of 6.0 kg/cm$^2$.

1.5 parts by weight of a tin based stabilizer and 45 parts by weight of a plasticizer (DOC) were mixed with 100 parts by weight of the obtained vinyl chloride based nanocomposite and kneaded for 5 minutes at 150° C. using a roll, resulting in preparation of a sheet. Using a colorimeter, an L value and a b value of the sheets were measured and then a whiteness index (WI) was calculated using the formula below. As a result, the whiteness index (WI) was determined to be 76.2.

$$WI=L(L-5.7\times b)/100-4$$

EXAMPLE 5

Polymerization was carried out in the same manner as in Example 1, except that 10 kg of nano-carbon black having a size of 40 nm was used instead of nano-silica having a size of 80 nm, 1.0 kg of a poly maleic acid vinyl acetate copolymer was used instead of 1.5 kg of the polycarboxylic acid based (co)polymer as an unsaturated organic acid polymer, the reaction was carried out while maintaining 65° C. to accomplish an average polymerization degree of 800 instead of 57° C. to accomplish an average polymerization degree of 1000 during an overall polymerization process, and reaction terminators were added when pressure of the polymerization reactor reached 8.0 kg/cm$^2$ instead of 6.0 kg/cm$^2$.

Figure 7:
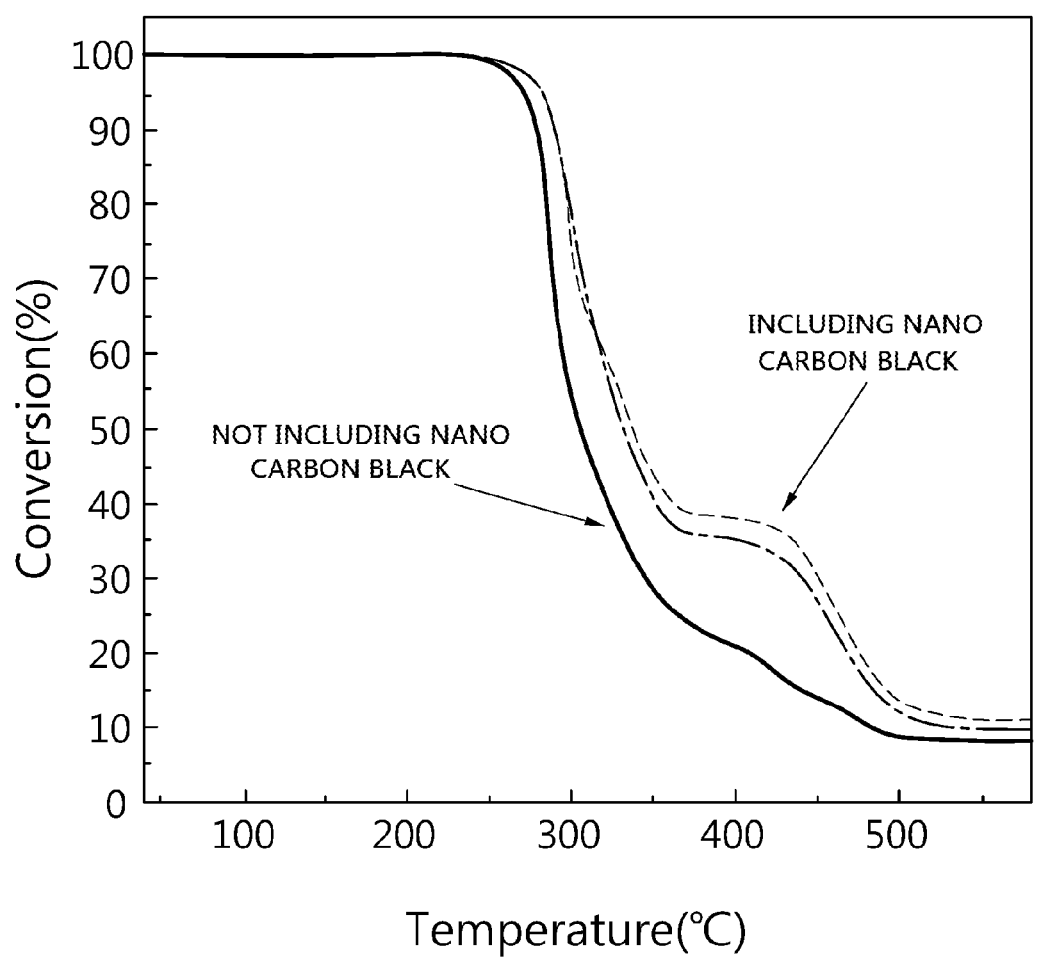
FIG. 7 illustrates a comparison graph for thermal stability of a vinyl chloride based resin, which does not include a hydrophilic inorganic nanomaterial and a hydrophilic polymer, according to Comparative Example 2 and a vinyl chloride based nanocomposite according to Example 5.

Thermal stability of the obtained vinyl chloride based nanocomposite was measured using a TGA Q50. Results are illustrated in FIG. 7.

For reference, thermal stability measurement conditions are as follows:

<Measurement Conditions>
1: Equilibrate at 40.00° C.
2: Ramp 10.00° C./min to 100.00° C.
3: Isothermal for 60.00 min (removal of remaining H$_2$O)
4: Ramp 5.00° C./min to 600.00° C.
5: Isothermal for 10.00 min A surface SEM image and sectional SEM image of each of the vinyl chloride based nanocomposites prepared according to Examples 1 to 5 are illustrated in FIGS. 1 to 5.

From the images, it can be confirmed that the vinyl chloride based nanocomposites, in which a content ratio of coarse particles to fine particles uniformly dispersed by the suspension polymerization is 95:5 to 99:1, including the inorganic nanomaterial were prepared.

COMPARATIVE EXAMPLE 1

Polymerization was carried out under the same conditions as in Example 1, except that 15 kg of nano-calcium carbonate having a size of 80 nm was used instead of the nano-silica having a size of 80 nm and 1.5 kg of lauryl phosphate was used instead of 1.5 kg of the polycarboxylic acid based (co)polymer.

Figure 6:
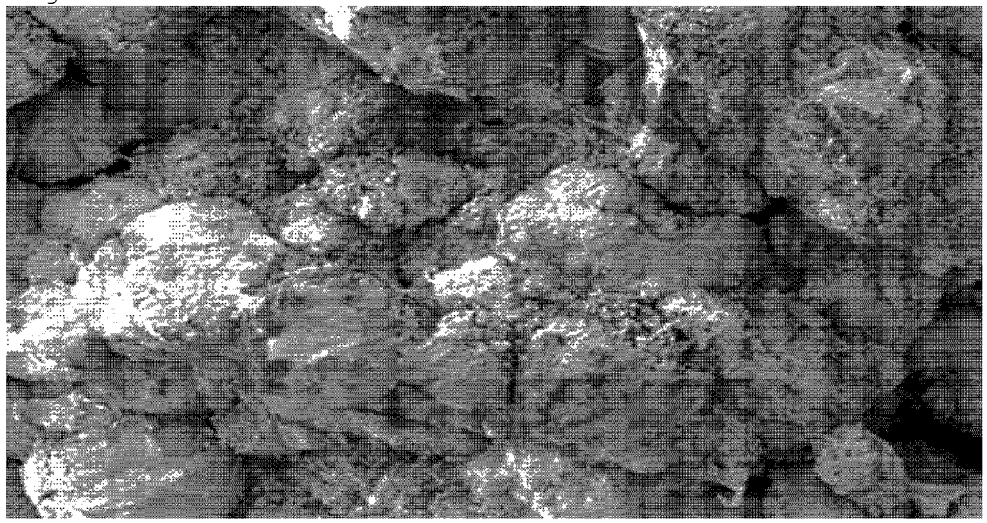
FIG. 6 illustrates an SEM image (×150) of vinyl chloride based organic/inorganic nanocomposite particles obtained using a general and simple dispersant according to Comparative Example 1.

As shown in an SEM image of FIG. 6, a large amount of lump type scales were generated due to poor dispersion of the inorganic nanomaterial and the polymerization process also was not properly performed.

In addition, measurement of the properties of the nanocomposite obtained according to Comparative Example 1 was attempted, according to the methods used in Examples 1 to 5. However, it was impossible to measure the properties since the hydrophilic inorganic nanomaterial, which does not include a hydrophilic polymer of an unsaturated organic acid based resin or a polycarboxylic acid based resin, was not easily dispersed and, thus, lump type particles were generated, and, accordingly, melting was not performed and processing was difficult.

COMPARATIVE EXAMPLE 2

To a reactor having an inner space of 1 m$^3$ and equipped with a reflux condenser, 390 kg of deionized water was added. In addition, 150 g of polyvinylalcohol having a hydration degree of 78%, 120 g of polyvinylalcohol having a hydration degree of 40%, and 30 g of hydroxypropylmethyl cellulose was added to the reactor at the same time. Subsequently, 300 kg of vinyl chloride monomer was added to the reactor and then 30 g of di-2-ethylhexylperoxydicarbonate and 120 g of t-butylperoxy neodecanoate were added thereto. Subsequently, reaction was carried out while maintaining a polymerization temperature of 57° C. during an overall polymerization process to accomplish an average polymerization degree of 1000.

When a pressure of the polymerization reactor reached 6.0 kg/cm$^2$, 15 g of 4-hydroxy-2,2,6,6-tetramethyl-piperidine-1-oxyl and 60 g of triethylene glycol-bis-3-(3-t-butyl-4-hydroxy-5-methylphenyl)propionate as reaction terminators were added to the reactor. Subsequently, unreacted monomers were collected and a resin slurry was collected from the polymerization reactor. The obtained slurry was dried in a fluidized bed dryer through a general method. As a result, a chloroethylene based polymer was obtained.

Properties of the vinyl chloride based resin obtained according to Comparative Example 2 were measured in the same manners as in Examples 1 to 5. As a result, transparency was 73.1, tensile strength was 525 Kg/cm$^2$, a melting time was 165 seconds, impact strength was 3.2 Kgf·cm/cm$^2$, and a whiteness index (WI) was 70.5.

In addition, thermal stability was measured in the same manner as in Example 5 and is illustrated in FIG. 7. As shown in FIG. 7, the thermal stability was dramatically improved by 20° C. or more.

As a result, the examples including the hydrophilic inorganic nanomaterial and the hydrophilic polymer exhibit a transparency of 78.8, a tensile strength of 650 Kg/cm$^2$, an impact strength of 90 Kgf·cm/cm$^2$, and a thermal resistance of 76.2. Accordingly, it can be confirmed that the examples have improved properties, when compared with the vinyl chloride based resin not including the hydrophilic inorganic nanomaterial and the hydrophilic polymer according to Comparative Example 2.

The examples exhibited improved thermal stability when compared with Comparative Example 2 and a melting time of the examples was dramatically shortened to 105 seconds, when compared with Comparative Example 2 having a melting time of 165 seconds.

What is claimed is:

1. A method of preparing a vinyl chloride based nanocomposite, the method comprising:

mixing a hydrophilic inorganic nanomaterial, at least one hydrophilic polymer selected from an unsaturated organic acid based polymer and a polycarboxylic acid based (co)polymer, and water to prepare a water dispersion suspension;

adding a protective colloidal agent and a vinyl chloride based monomer to the water dispersion suspension and mixing to prepare a solution;

adding an initiator to the solution and suspension polymerizing to prepare a slurry of the vinyl chloride based nanocomposite;

adding reaction terminators when reaction pressure in the suspension polymerization reaches 6.0 to 8.0 $kg/cm^2$; and drying the slurry of the vinyl chloride based nanocomposite in a fluidized bed dryer to prepare the vinyl chloride based nanocomposite.

2. The method according to claim 1, wherein the water dispersion suspension comprises 1 to 20 parts by weight of the hydrophilic inorganic nanomaterial and 0.01 to 1.5 parts by weight of the at least one hydrophilic polymer selected from the unsaturated organic acid based polymer and the polycarboxylic acid based (co)polymer, based on 100 parts by weight of water.

3. The method according to claim 1, wherein the solution comprises 100 to 200 parts by weight of the water dispersion suspension, and 0.001 to 5 parts by weight of the protective colloidal agent, based on 100 parts by weight of the vinyl chloride based monomer.

4. The method according to claim 3, wherein the protective colloidal agent is at least one selected from a vinyl alcohol based resin having a hydration degree of 70 to 98% and a vinyl alcohol based resin having a hydration degree of 35 to 60%.

5. The method according to claim 1, wherein the initiator is added in an amount of 0.0001 to 0.5 parts by weight, based on 100 parts by weight of the vinyl chloride based monomer.

6. The method according to claim 5, wherein the initiator is at least one selected from the group consisting of diacyl peroxides, peroxydicarbonates, peroxyesters, azo compounds, and sulfates.

* * * * *